United States Patent
Williams

(10) Patent No.: US 6,993,033 B1
(45) Date of Patent: Jan. 31, 2006

(54) METHOD AND APPARATUS FOR SYNCHRONIZING AGING OPERATIONS ASSOCIATED WITH AN ADDRESS TABLE

(75) Inventor: Robert A. Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1032 days.

(21) Appl. No.: 09/824,702

(22) Filed: Apr. 4, 2001

(51) Int. Cl.
*H04L 12/28* (2006.01)

(52) U.S. Cl. .................................... 370/400

(58) Field of Classification Search ............... 370/351, 370/389, 392, 400, 412–418, 503

See application file for complete search history.

(56) References Cited

U.S. PATENT DOCUMENTS 6,813,268 B1 * 11/2004 Kalkunte et al. ........... 370/392
2003/0110344 A1 * 6/2003 Szczepanek et al. ........ 711/100

* cited by examiner

*Primary Examiner*—Huy D. Yu
*Assistant Examiner*—Jason Mattis
(74) *Attorney, Agent, or Firm*—Harrity & Snyder, LLP

(57) ABSTRACT

A network device that controls the communication of data frames between stations includes an address table that has a number of entries including address information and data forwarding information. The network device also includes a timer that defines an aging cycle associated with the address table. When the timer times out, the timer sends a signal to an aging device that initiates an aging process on the address table. The timer also transmits a time-out signal to interrupt logic on the network device. The interrupt logic receives the time-out signal and transmits an interrupt signal to an external device. The external device may then perform an aging process on an address table stored in its memory.

16 Claims, 5 Drawing Sheets

| STATIC BIT | HIT BIT | VLAN INDEX | PORT VECTOR | MAC ADDRESS | NEXT POINTER |

METHOD AND APPARATUS FOR SYNCHRONIZING AGING OPERATIONS ASSOCIATED WITH AN ADDRESS TABLE

TECHNICAL FIELD

The present invention relates generally to network communications and, more particularly, to synchronizing aging operations associated with an address table.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of data and includes logic for receiving and forwarding data frames to their appropriate destinations.

Conventional network switches typically include an address table that stores switching information associated with forwarding the received data frames. Such switches often include an aging mechanism that automatically deletes address table entries that correspond to network stations that have not transmitted any data frames during a predetermined period of time. This enables the network switch to have space for new address entries associated with active network stations.

In some situations, an external management entity may interface with the network switch. For example, the external management entity may be involved in programming various functions associated with the network switch. The external management entity may also require information regarding station addresses for security reasons or for other reasons. For example, in a high security switch, the external management entity may be required to approve new entries in the address table. In order to make a new entry in the address table, the external management entity needs to know which locations are available.

DISCLOSURE OF THE INVENTION

There exists a need for a mechanism that enables an external device and a network device to maintain consistent copies of an address table used to generate frame-forwarding information.

This and other needs are met by the present invention, where a network device and an external management device both store address tables containing the same information. When a timer on the network device times out, the timer transmits a signal to an aging mechanism on the network device. The signal indicates that aging on the address table in the network device is to begin. The timer also transmits a signal to a logic device when the timer times out. The logic device then notifies the external management device that aging on the address table in the external management device is to begin.

According to one aspect of the present invention, a network device that controls communication of data frames between stations is provided. The network device includes a plurality of receive ports configured to receive data frames from the stations and a memory configured to store address information and data forwarding information associated with the received data frames. The address information and data forwarding information are stored as a number of entries in a first address table. The network device also includes a timer configured to transmit a signal at a predetermined interval of time, where the predetermined interval of time defines an aging cycle associated with the first address table. The network device further includes an aging device configured to receive the signal from the timer and initiate an aging process on the first address table. The network device also includes interrupt logic configured to receive the signal from the timer and transmit an interrupt signal to an external device, where the interrupt signal indicates that the aging process on the first address table has been initiated.

Another aspect of the present invention provides a method that includes storing information in a memory of a network device. The information is stored as a plurality of entries in a first address table in the memory with each entry including address information and data forwarding information. The method also includes receiving data frames on a plurality of receive ports of the network device and initiating an aging process on the first address table at predetermined intervals of time. The method further includes transmitting a signal to an external device at the predetermined intervals of time, the signal indicating that the aging process on the first address table has been initiated.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

FIG. 4 is a diagram illustrating an entry in the address table of FIG. 3, according to an exemplary implementation consistent with the present invention.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
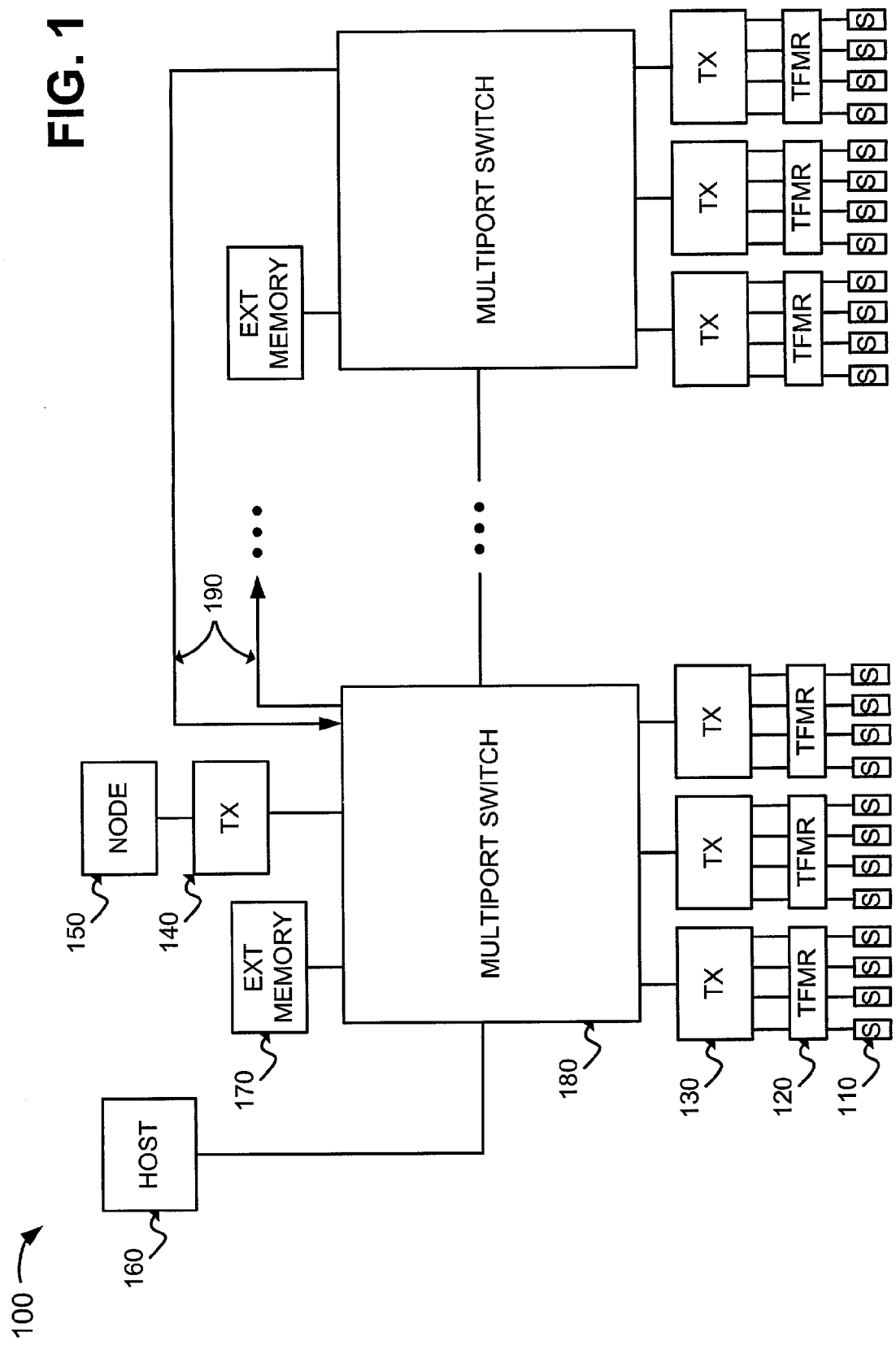
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
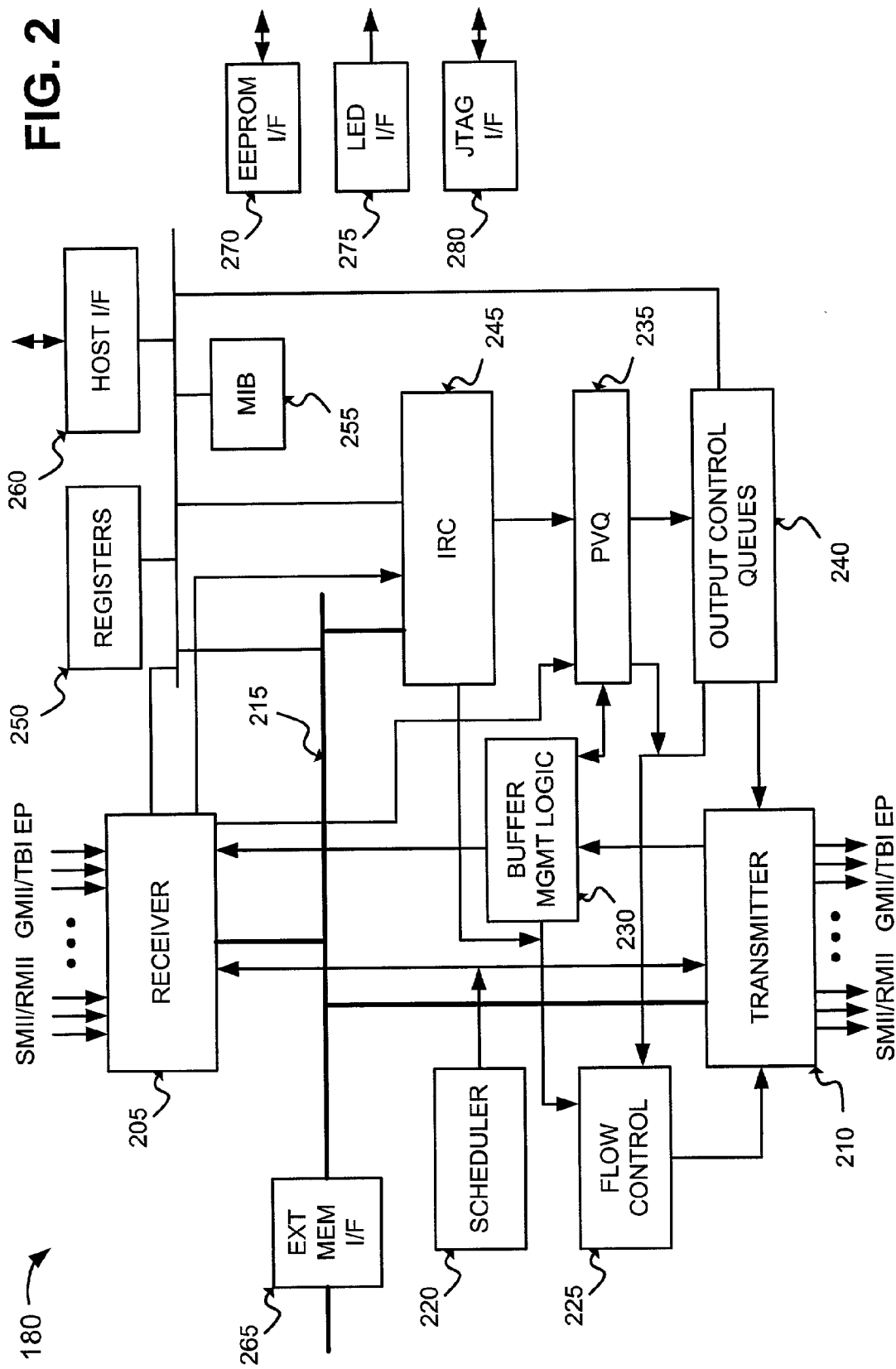
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Synchronizing Hardware and Software Aging

The present invention is directed to providing an aging mechanism in a network device, such as multiport switch 180. The multiport switch 180, consistent with the present invention, includes an interrupt mechanism that synchronizes the aging process it performs with an aging process performed by an external device.

Figure 3:
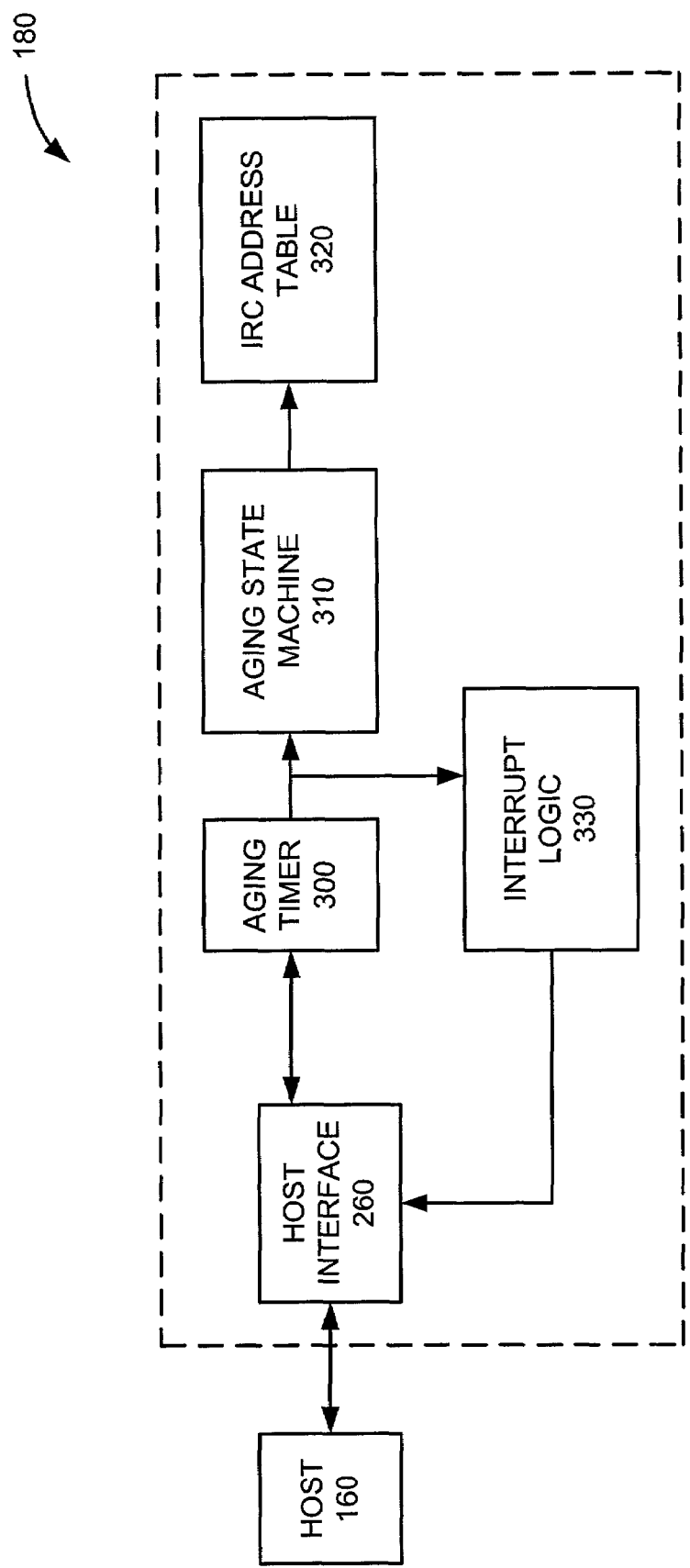
FIG. 3 is an exemplary detailed block diagram of a portion of the multiport switch of FIG. 1, consistent with an implementation of the present invention.

FIG. 3 illustrates a portion of multiport switch 180 consistent with an exemplary implementation of the present invention. Referring to FIG. 3, multiport switch 180 includes aging timer 300, aging state machine 310, IRC address table 320, interrupt logic 330 and host interface 260. In an exemplary implementation of the present invention, the aging timer 300, aging state machine 310, IRC address table 320 and interrupt logic 330 may be located within the IRC 245. In alternative implementations, one or more of these components may be located outside the IRC 245 within one or more other parts of the multiport switch 180 or external to the multiport switch 180. FIG. 3 also includes host 160 (FIG. 1), also referred to as host CPU 160, coupled to host interface 260. The host CPU 160 may include any conventional computer or processing device that includes at least one processor or microprocessor and a memory, such as a random access memory (RAM).

The aging timer 300 is a programmable timer that defines an aging cycle. That is, the aging timer 300 determines how often the multiport switch 180 performs an aging process. The aging timer 300 may be set to a default value, such as five minutes, upon power-up of the multiport switch 180. The aging timer 300 may also be programmable by the host 160 via host interface 260, based on network conditions and/or user requirements.

The aging state machine 310 receives an aging signal upon timeout of the aging timer 300 and examines the entries in the IRC address table 320 to determine whether to "age" (i.e., delete or invalidate) entries in the IRC address table 320. The IRC address table 320 supports a number of network addresses and capabilities for a number of virtual local area networks (VLANs). In an exemplary implementation, the IRC address table 320 supports 4096 addresses and 64 unique VLANS. The number of addresses and VLANs supported by the IRC address table 320, however, may be increased or decreased by changing the table size.

FIG. 4 illustrates an exemplary format of an entry in IRC address table 320. Referring to FIG. 4, the address table entry 400 includes a static bit, a hit bit, a VLAN index field, a port vector field, a MAC address field and a next pointer field. The static and hit bits are used by the aging state machine 310 during the aging process, as described in more detail below. The VLAN index field may be used to reference a VLAN identifier. The port vector field identifies the port(s) to which a frame should be forwarded. The MAC address field includes addresses associated with both the source and destination addresses of received data frames. The MAC address field is used for matching the address information included with the received data frames to an entry in the IRC address table 320. The next pointer field identifies another entry in the IRC address table 320 associated with searching the IRC address table 320. The fields illustrated in FIG. 4 are exemplary only. It should be understood that additional fields or other fields may be included in an IRC address table entry 400 in other implementations consistent with the present invention.

Returning to FIG. 3, the interrupt logic 330 includes logic that identifies an aging start signal from the aging timer 300. The interrupt logic 330 transmits an interrupt to host interface 260 in response to receiving the aging start signal, as described in more detail below. This enables the host CPU 160 to synchronize its aging cycle with the aging cycle of the multiport switch 180.

Figure 5:
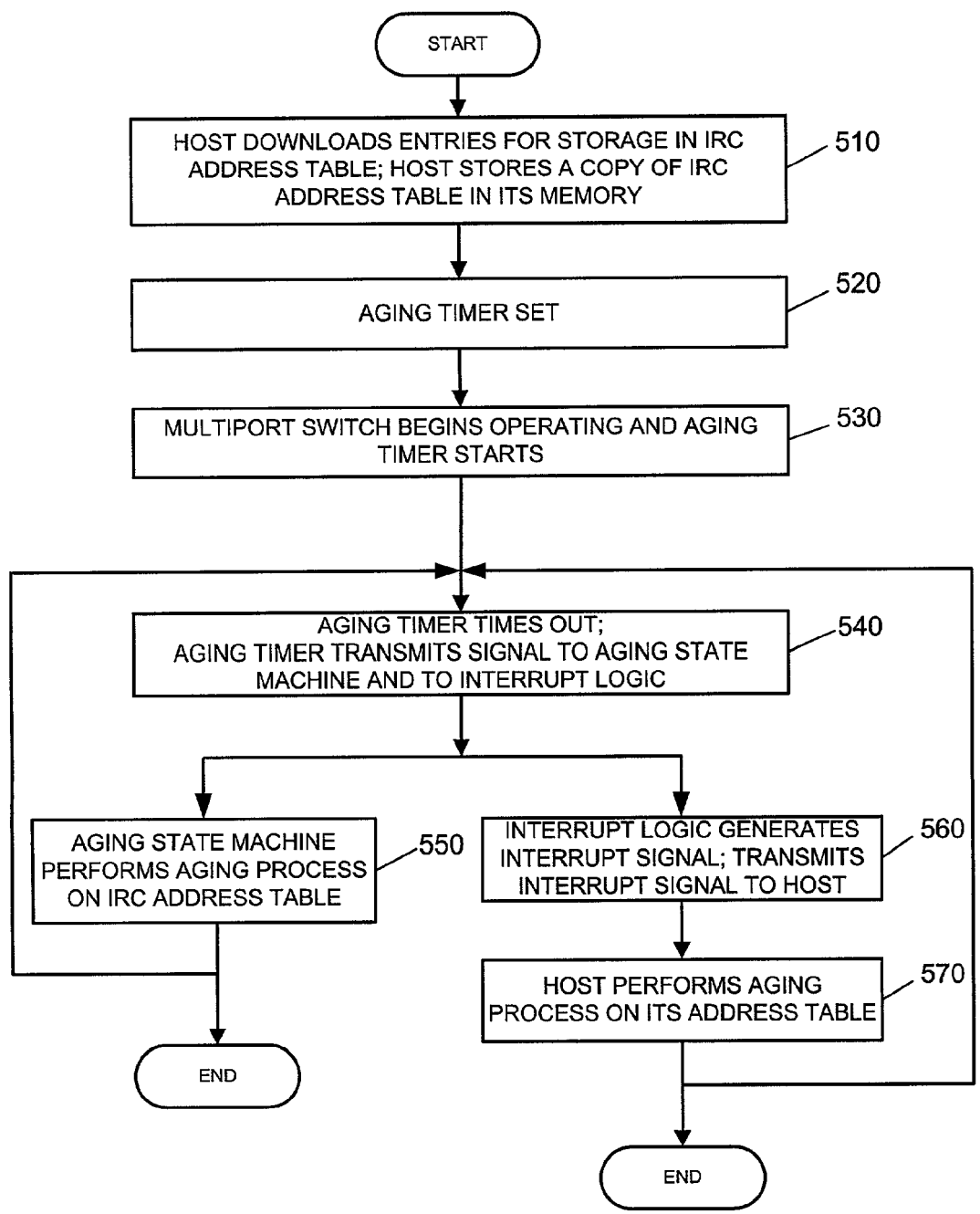
FIG. 5 is a flow diagram illustrating an exemplary process for synchronizing aging operations, consistent with an implementation of the present invention.

FIG. 5 illustrates exemplary processing by multiport switch 180 in an implementation consistent with the present invention. Processing may begin upon start-up of multiport switch 180 and host CPU 160. Upon start-up, the multiport switch 180 initializes various registers and tables, such as the IRC address table 320. The host CPU 160 may be involved in initializing the IRC address table 320. In this case, the multiport switch 180 and host CPU 160 establish communications via host interface 260. The host CPU 160 may then download the entries for storage in the IRC address table 320 [step 510]. The host CPU 160 may also store a copy of the IRC address table 320 in its own memory [step 510]. As described previously, the host CPU 160 includes a processor or microprocessor and a memory for storing information. In alternative implementations, the IRC 245 may initialize the entries in the IRC address table 320 upon powering up and the host CPU 160 may copy the IRC address table 320 into its own memory.

In any event, after the IRC address table 320 is initialized, the host CPU 160 and multiport switch 180 both include identical copies of the IRC address table 320. The multiport switch 180 also sets default values associated with various functions that it performs. For example, the multiport switch 180 sets a default value for the aging timer 300 [step 520]. In an exemplary implementation, the default value may be set to five minutes. Alternatively, the default value may be set to other values based on the user's requirements and network conditions. In other scenarios, the aging timer 300 may be programmed by the user via host CPU 160.

Next, assume that the multiport switch 180 begins operating and the aging timer 300 starts [step 530]. As described previously, the aging timer 300 defines the aging cycle. At the end of the predetermined aging cycle, the aging timer 300 times out [step 540]. When this occurs, the aging timer 300 transmits a signal to the aging state machine 310 to initiate the aging process [step 540]. The aging timer 300 also transmits the time-out signal, indicating that the aging process is to start, to interrupt logic 330 [step 540]. In other words, the aging timer 300 may simultaneously transmit a time-out signal to aging state machine 310 and interrupt logic 330, where the time-out signal indicates that the aging process is to begin. In alternative implementations, the interrupt logic 330 may monitor the bus connecting the aging timer 300 and the aging state machine 310 to determine when the time-out signal is asserted.

In any event, assume that the aging state machine 310 receives the signal from the aging timer 300 and begins the aging process [step 550]. In an exemplary implementation, the aging state machine 310 examines each entry in IRC address table 320 to determine whether to delete the entry or invalidate the entry. An invalidated entry may then be overwritten by a new address entry. As described previously, each IRC address table entry 400 includes a static bit and a hit bit (FIG. 4). The hit bit is used for address entry aging. When the IRC 245 receives frame header information, it searches the IRC address table 320 for an entry that matches the source address (SA) and VLAN index included in the frame header. If a match is identified, the IRC 245 sets the hit bit in the entry where the match is identified. The IRC 245 also sets the hit bit when it creates a new entry in the IRC address table 320. The static bit, also referred to as the aging override bit, when set in an entry, prevents the aging state machine 310 from deleting the entry.

The aging state machine 310 performs the aging process by examining each entry in the IRC address table 320. In an exemplary implementation, the aging state machine 310 deletes each entry in the IRC address table 320 in which both the static bit and hit bit are not set. In this manner, entries corresponding to network stations that have not transmitted data during a predetermined period of time may be deleted from the IRC address table 320. The aging state machine 310 may also clear the set hit bits when examining the entries. This enables the aging state machine 310 to identify entries in the next aging cycle that may be inactive. The aging process described above repeats each time the aging timer 300 times out. That is, after the aging timer 300 times out, the aging timer 300 restarts and times out again. The aging state machine 310 then performs the aging process again.

As described above, the aging timer 300 also transmits the time-out signal to interrupt logic 330 at the same time it transmits the time-out signal to aging state machine 310. The interrupt logic 330 receives the signal from the aging timer 300, generates a CPU interrupt signal and transmits the CPU interrupt signal to host interface 260 [step 560]. The host interface 260 receives the CPU interrupt signal and forwards the CPU interrupt signal to host CPU 160 [step 560]. The host CPU 160 receives the CPU interrupt signal and initiates an aging process on the address table stored in its memory [step 570].

The host CPU 160 performs its aging process in the same manner as described with regard to the aging state machine 310 of multiport switch 180. That is, the host CPU 160 deletes entries in its address table in which both the static and hit bits are not set. The host CPU 160, however, performs its aging process via software control, as opposed to the hardware-based aging process performed by aging state machine 310. The process then repeats each time the aging timer 300 times out. That is, the interrupt logic 330 receives the signal from the aging timer 300 indicating that aging is to begin, generates a CPU interrupt signal and transmits the CPU interrupt signal to host CPU 160. The host CPU 160 receives the CPU interrupt signal and performs its aging function again.

It should also be understood that the host CPU 160 may monitor the processing performed by the multiport switch 180. That is, when the IRC 245 sets the hit bit for an entry in the IRC address table 320 or "learns" (i.e., adds) new address entries, the host CPU 160 similarly makes these modifications to the address table stored in its memory. In this manner, when the host CPU 160 performs the aging process, the address table in the host CPU 160 is identical to the IRC address table 320. This ensures that the host CPU 160 and multiport switch 180 maintain consistent address tables.

In the manner described above, the multiport switch 180 and host CPU 160 perform their respective aging processes at approximately the same time. Since the time required to perform the aging is very short as compared to the aging cycle, the address tables maintained in the multiport switch 180 and the host CPU 160 will be consistent for a very large percentage of the time. This avoids problems associated with the host CPU 160 and multiport switch 180 each using their own timers to define the aging cycle. For example, CPU timers associated with a device such as host CPU 160 are typically not very accurate, which would result in the aging cycles for the host CPU 160 and multiport switch 180 getting out of synchronization. In this situation, the contents of the address table maintained by the host CPU 160 could be different from the contents of IRC address table 320 for a considerable period of time.

Described has been an apparatus and method for synchronizing aging processes performed by multiport switch 180 and host 160. One advantage of the present invention is that the host 160 maintains its own address table, thereby saving time associated with accessing and reading the IRC address table 320. Another advantage of the present invention is that the aging processes performed by the host 160 and multiport switch 180 are synchronized, resulting in the contents of the two address tables remaining consistent. This enables the host 160 to know which locations in the address table are available for new entries. A further advantage of the present invention is that the synchronizing function may be implemented with little hardware on the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described in relation to an address table containing certain fields used in connection with an aging process. The present invention may also be used in situations where an address table includes other fields associated with determining whether to age entries from the address table.

What is claimed is:

1. A network device configured to control communication of data frames between stations, comprising:
   a plurality of receive ports configured to receive data frames from the stations;
   a memory configured to store address information and data forwarding information associated with the received data frames, the address information and data forwarding information being stored as a plurality of entries in a first address table;
   a timer configured to transmit a signal at a predetermined interval of time, the predetermined interval of time defining an aging cycle associated with the first address table;
   an aging device configured to receive the signal from the timer and initiate an aging process on the first address table; and
   interrupt logic configured to receive the signal from the timer and transmit an interrupt signal to an external device associated with managing the operation of the network device, the interrupt signal indicating that the aging process on the first address table has been initiated, and
   wherein the external device stores a second address table corresponding to the first address table stored in the memory of the network device, each entry in the second address table including an address hit field and an aging override field, and wherein the interrupt signal causes the external device to determine whether to at least one of delete or invalidate an entry in the second address table based on information in the address hit field and the aging override field of the second address table.

2. The network device of claim 1, wherein each entry in the first address table includes an address hit field and an aging override field and the aging device is further configured to:
   examine each of the entries in the first address table and determine whether to at least one of delete or invalidate an entry based on the address hit field and aging override field in the first address table.

3. The network device of claim 1, wherein the timer is programmable.

4. The network device of claim 1, wherein the aging process performed on the first address table is substantially synchronized with an aging process performed on the second address table stored in the external device, wherein the interrupt signal causes the external device to determine whether to delete or invalidate an entry in the second address table independently from the aging process performed on the first address table.

5. The network device of claim 1, wherein the aging device comprises an aging state machine that performs a hardware-controlled aging process on the first address table; and wherein the external device comprises a processor and a memory storing the second address table and the processor performs a software-controlled aging process on the second address table in response to receiving the interrupt signal.

6. A method comprising:

storing information in a memory of a network device, the information being stored as a plurality of entries in a first address table in the memory, each entry including address information and data forwarding information;

receiving data frames on a plurality of receive ports of the network device;

initiating an aging process on the first address table at predetermined intervals of time;

transmitting a signal to an external device at the predetermined intervals of time, the signal indicating that the aging process on the first address table has been initiated;

storing a second address table in the external device, the second address table corresponding to the first address table, each entry in the second address table including an address hit field and an aging override field;

receiving the signal at the external device; and performing an aging process on the second address table in response to the received signal, wherein the aging process on the second address table includes:

determining whether to at least one of invalidate or delete an entry in the second address table based on the address hit field and the aging override field in the second address table.

7. The method of claim 6, wherein the aging process performed on the first address table is substantially synchronized with the aging process performed on the second address table.

8. The method of claim 6, further comprising:

modifying the first address table based on the received data frames;

monitoring, by the external device, the modifications to the first address table; and updating the second address table based on the modifications to the first address table.

9. The method of claim 8, wherein the modifying includes:

setting a hit bit in a first entry in the first address table when information included in a received data frame matches the information in the first entry.

10. The method of claim 6, wherein each entry in the first address table includes an address hit field and an aging override field, the method further comprising:

reading each entry in the first address table; and determining whether to at least one of invalidate and delete an entry based on the address hit field and the aging override field in the first address table.

11. The method of claim 6, wherein the aging process performed on the second address table is performed independently from the aging process associated with the first address table.

12. A system comprising:

a network device configured to receive data frames from a plurality of stations and generate frame forwarding information for the received data frames, the network device comprising:

a first memory configured to store address information and data forwarding information associated with the received data frames, the address information and data forwarding information being stored as a plurality of entries in a first address table, a timer configured to transmit a time-out signal at predetermined intervals of time, the predetermined intervals defining an aging cycle, an aging mechanism configured to receive the time-out signal and, in response to receiving the time-out signal, initiate an aging process on the first address table, and a logic device configured to receive the time-out signal and, in response to receiving the time-out signal, transmit an interrupt signal; and a processing device located externally from the network device, the processing device comprising:

a second memory configured to store a second address table corresponding to the first address table, the second address table including an address hit field and an aging override field, and a processor configured to receive the interrupt signal from the logic device and, in response to receiving the interrupt signal, perform an aging process on the second address table, wherein the aging process performed by the processor includes determining whether to at least one of delete or invalidate an entry in the second address table based on information stored in the address hit field and the aging override field of the second address table.

13. The system of claim 12, wherein the aging process performed on the first address table is substantially synchronized with the aging process performed on the second address table.

14. The system of claim 12, wherein the aging mechanism comprises an aging state machine that performs a hardware-controlled aging process on the first address table and the processor performs a software-controlled aging process on the second address table.

15. The system of claim 12, wherein the aging mechanism and the logic device receive the time-out signal at substantially the same time.

16. The system of claim 12, wherein the processor performs the aging process on the second address table independently from the aging process associated with the first address table.

* * * * *